United States Patent [19]

Waller et al.

[11] Patent Number: 5,229,575
[45] Date of Patent: Jul. 20, 1993

[54] THERMODE STRUCTURE HAVING AN ELONGATED, THERMALLY STABLE BLADE

[75] Inventors: Debra L. Waller, Cambridge; Louis E. Colella, Billerica, both of Mass.; Ronald Pacheco, Derry, N.H.

[73] Assignee: Digital Equipment Corporation, Maynard, Mass.

[21] Appl. No.: 722,648

[22] Filed: Jun. 28, 1991

[51] Int. Cl.$^5$ .......................... H05B 3/00; B23K 3/02
[52] U.S. Cl. .................... 219/233; 219/85.16; 219/221; 219/228; 219/243; 228/51; 228/180.2
[58] Field of Search .................. 219/221, 227–239, 219/243, 85.16; 228/51–55, 180.2

[56] References Cited

U.S. PATENT DOCUMENTS

| | | | |
|---|---|---|---|
| 1,802,079 | 4/1931 | Helle | 219/85.16 |
| 2,514,618 | 7/1950 | Ancell | 219/227 |
| 4,871,899 | 10/1989 | DuFrenne | 219/85.16 X |
| 4,942,282 | 7/1990 | Jensen | 219/233 X |

FOREIGN PATENT DOCUMENTS 197382  8/1990  Japan ..................... 228/180.2

OTHER PUBLICATIONS

"Bonding Tip Temperature Control", Coombs et al, IBM Technical Disclosure Bulletin vol. 23, No. 10, Mar. 1981.
"Three-legged Solder Reflow Bonding Tip", Houser, IBM Technical Disclosure Bulletin vol. 22, No. 1, Jun. 1979.
Individually Controllable Wire Solder Reflow Bonding Tip, Baldwin et al, IBM Technical Disclosure Bulletin vol. 18, No. 12, May 1976.

*Primary Examiner*—Anthony Bartis
*Attorney, Agent, or Firm*—Cesari and McKenna

[57] ABSTRACT

A thermode having a relatively long and thick blade composed of a high thermal conductivity, low thermal expansion material, e.g., molybdenum, provides an elongated contact surface for bonding a row of leads of an electronic component to a circuit board. A thermode holder is coupled to the blade by means of a plurality of struts, including a pair of outer struts, each connected at one end of the respective ends of the blade and at an acute angle facing the other outer strut, and a pair of shorter inner struts, each connected with the blade intermediate the ends of the blade and at an acute angle facing the outer strut adjacent thereof, such that in response to a force urging the blade against the circuit board, the outer struts cause a negative deflection of the blade with respect to the board and the inner struts decrease the magnitude of the deflection. The blade is heated by electric current supplied thereto from a transformer through the inner and outer struts. A step in the contact surface of the blade provides an acceptally narrow bonding footprint while allowing use of a desirably thermally massive thick blade.

15 Claims, 2 Drawing Sheets

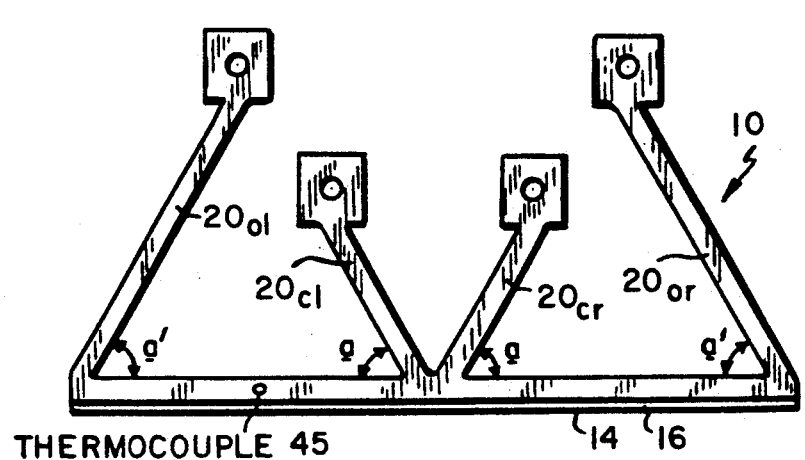
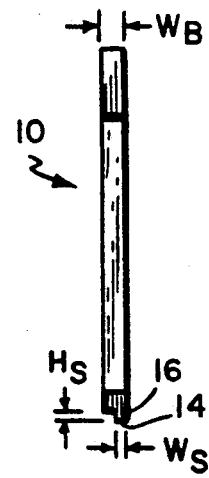
FIG. 3          FIG. 3A
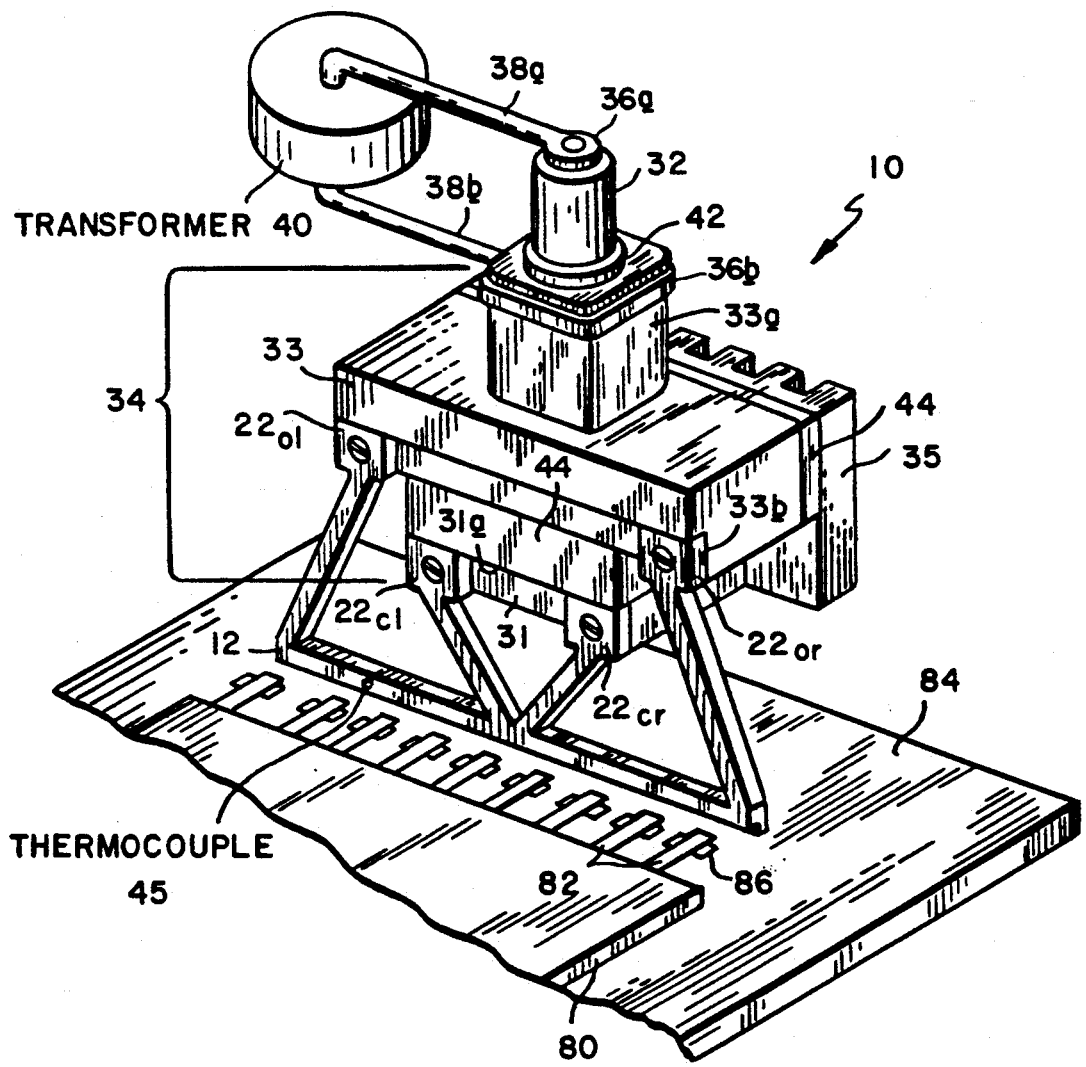
FIG. 4

THERMODE STRUCTURE HAVING AN ELONGATED, THERMALLY STABLE BLADE

FIELD OF THE INVENTION

This invention relates generally to electronic assembly operations and, more specifically, to an apparatus for soldering components to circuit boards.

BACKGROUND OF THE INVENTION

Typically, a thermode is a device that is commonly used for soldering operations in electronic assembly. The thermode includes a blade supported in a holder and connected to a power supply unit, which includes a transformer. The power supply provides an electric current directly to the blade to heat it during contact with and simultaneous soldering of a plurality of leads of an electronic component to conductor pads on an electronic circuit board.

In order to apply uniform pressure to the component leads and circuit board, the contact surface of the thermode blade should maintain a relatively flat profile. In addition, the blade contact surface should have a uniform temperature so that reliable soldering takes place at all the circuit board pads without overheating any of them. Furthermore, the thermode should maintain these uniformities under various heating and cooling cycles, i.e. heating and cooling that occurs before, during and after contact with the component and circuit board.

When soldering the component to the circuit board, it is often desired to increase the current supplied to the thermode to either reduce the time it takes the blade to attain a desired temperature or to maintain temperature uniformity across the blade. To increase the current through the thermode, a higher voltage is required between the ends of the thermode. Yet, the voltages to which the leads are subjected as a result of contact with the blade must be limited to avoid damage to the component.

The length of the thermode blade is typically equal to the length of the the work surface footprint, i.e. a side of the component having leads to be soldered; typically, the footprint length is approximately one inch. Advances in semiconductor technology have led to components having man leads and, thus, footprint lengths approaching as much as three inches. At the shorter blade lengths, the thermode provides uniform pressure and temperature at the work surface. However, with the longer blade lengths, the thermode blade deflects when contacting the work surface. Such deflection occurs in all blades and is primarily because of (i) thermal gradients in the blade and (ii) mechanical constraint of the blade, which prevents it from expanding freely. The magnitude of the deflection increases with blade length, resulting in uneven pressure and heat distribution at the contact surfaces of relatively long blades.

The performance of a thermode is measured, in part, by its ability to maintain a flat profile in the contact surface of the blade during bonding operations. FIG. 1 shows a prior art, generally U-shaped thermode 60 comprising a blade 62 with left and right side struts 64 and 66. At relatively short blade lengths, e.g. one inch, the U-shaped thermode 60 provides uniform pressure and heat to a work surface. But at longer blade lengths, e.g. three inches, the blade 62 deflects (shown in phantom) when it is heated.

One approach to soldering objects with relatively long footprints has been to use a smaller thermode that can bond a footprint side in sections. For example, a thermode blade first contacts a portion of the leads of a component and soldering ensues. The blade then contacts another portion of the leads to solder them. However, some of the leads may be subjected to two successive soldering cycles, resulting in damage to the component and circuit board. The soldering "overlap" is difficult to avoid because of the close proximity of the leads.

Attempts to increase the length of a thermode blade have resulted in thermode designs incorporating additional power terminals. FIG. 1A depicts such a thermode 70 with a plurality of parallel power terminals 74 oriented perpendicular to the blade 72. The additional power terminals reduce the maximum voltage difference across any section of the blade 72 and thus permit a higher heating current without subjecting components to undue voltage stress. The thermode 70 also provides structural support for a longer thermode blade 72; however, the additional poles 74 tend to create temperature gradients that result in unduly non-uniform heat distribution.

Therefore, it is among the objects to provide a thermode arrangement that minimizes deflection of a relatively long thermode blade during bonding operations.

It is also an object of the invention to provide a thermode with a blade capable of providing uniform heat distribution across a long-footprint work surface.

Additionally, it is an object to provide a thermode arrangement with a structure that provides uniform pressure across the long-footprint work surface.

SUMMARY OF THE INVENTION

Briefly, a thermode constructed in accordance with the invention comprises a generally long and thick blade with angular support struts configured to form a stable shape. The angular struts include a set of center struts and a set of outer struts arranged in a triangular configuration. The lengths and angular orientations of the struts are selected to minimize the deflection of the blade. In this respect, the center struts are shorter than the outer struts and are configured at opposing, but similar, angles, as are the outer struts.

The deflection of the blade is further minimized by using a thermode composed of a material, such as molybdenum, that has high thermal and electrical conductivity, as compared with prior blades, and a low thermal coefficient of expansion. The blade is relatively wide to provide a large thermal mass. This minimizes its change in temperature on contact with the bonding surface and thus minimizes changes in its shape arising from such contact; a narrowing step in the contact surface at the bottom of the blade provides a sufficiently narrow bonding footprint.

In operation, the thermode blade is coupled to a thermode holder and connected to a power supply. The thermode assembly is placed over a work surface and lowered to establish perpendicular contact between the blade and the work surface; soldering then ensues.

The thermode structure stabilizes a relatively long blade and, specifically minimizes mechanical deflection of the blade in the vertical direction during bonding operations. The use of a high conductivity material for the thermode provides uniform heat distribution across the blade and work surface by minimizing thermal gradients in the blade. The resulting long, stable blade, in turn, provides uniform pressure across the bonding surface, which may consist of many component leads and pads. The high electrical conductivity of the thermode material also provides faster heating at low voltage levels.

BRIEF DESCRIPTION OF THE DRAWINGS

The above and further advantages of the invention may be better understood by referring to the following description in conjunction with the accompanying drawings, in which:

FIG. 3 and 3A are front and side views, respectively, of the components of the thermode arrangement in accordance with the invention; and FIG. 4 is a drawing, partially an isometric view and partially a block diagram, of the thermode arrangement during soldering of leads of an electronic component to pads of a circuit board.

DETAILED DESCRIPTION OF ILLUSTRATIVE EMBODIMENTS

Figure 2:
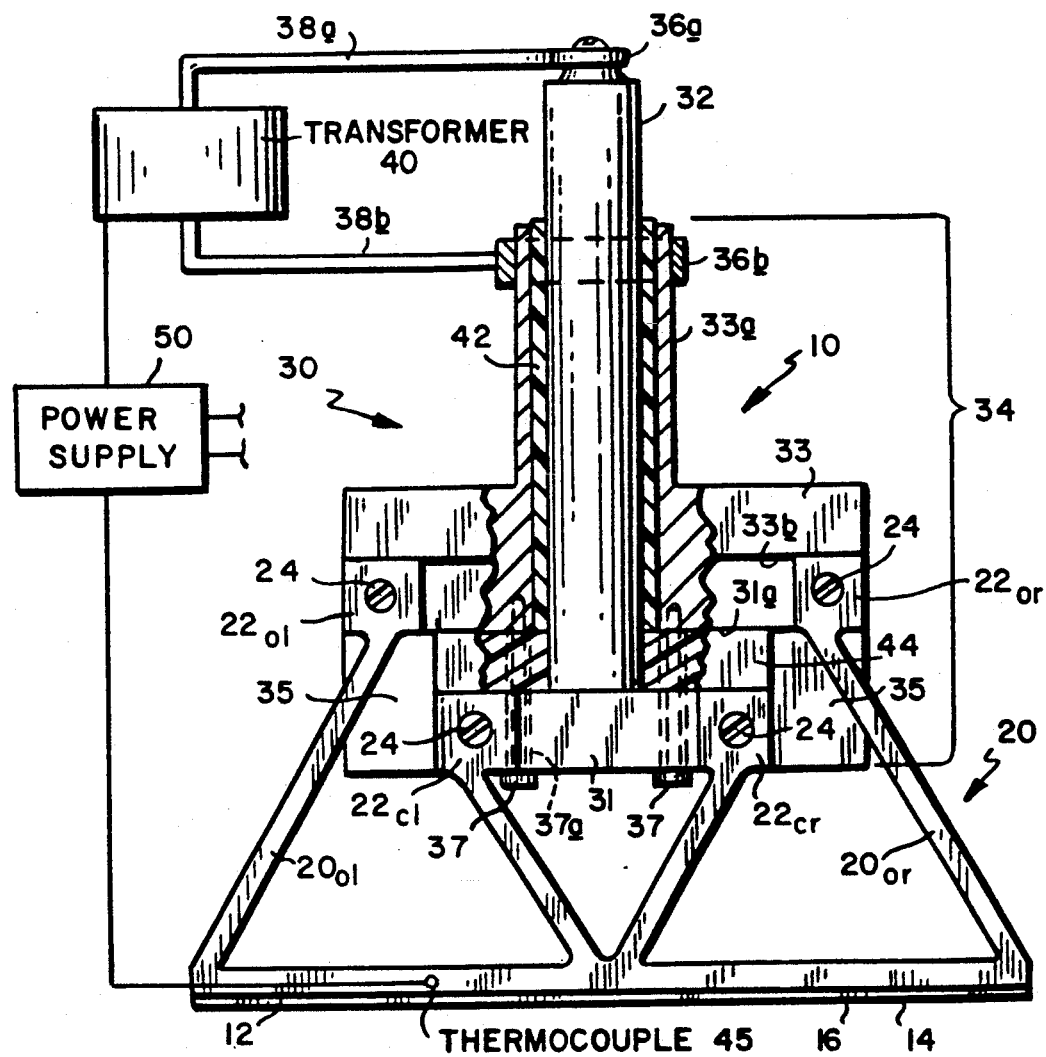
FIG. 2 is a drawing, partially a front view and partially a block diagram, of a thermode arrangement in accordance with the invention.

Referring to FIG. 2, a thermode 10 comprises a blade 12 coupled to a holder 30 by angular support struts, shown generally at 20. The holder 30 includes a center shaft 32 and a base 34. The struts 20 are preferably integrally formed with the blade 12 and include right and left center struts $20_{cr}$ and $20_{cl}$, and right and left outer struts $20_{or}$ and $20_{ol}$. The blade 12 is a generally elongate, generally rectangular member with a contact surface 14 that contacts a work surface (not shown) during bonding operations. The struts 20 are configured and arranged to support the application of uniform pressure along the contact surface 14 of the blade 12. Each strut 20 also functions as a pole or power terminal for connection to a power supply unit 50 via a transformer 40.

Specifically, as described further below in connection with FIG. 4, the ends of center struts $20_{cr}$ and $20_{cl}$ are coupled to terminals $22_{cr}$ and $22_{cl}$, respectively, while the ends of outer struts $20_{or}$ and $20_{ol}$ are coupled to terminals $22_{or}$ and $22_{ol}$. Also, a thermocouple device 45 is attached to the blade and coupled to the power supply unit 50 to control the temperature of the blade during bonding operations. This arrangement provides for the application of uniform heat required along the contact surface 14 to achieve proper bonding.

Referring to FIG. 3, the length of the relatively long thermode blade 12 is approximately 3.2 inches, which is substantially longer than prior art blades. Structural support for the blade 12 is provided, in part, by the outer angular struts $20_{ol,or}$. Although the orientations of the struts $20_{ol,or}$ contribute to a flat contact surface 14 for the blade 12, they permit some vertical deflection of the blade under pressure during contact with a work surface. To minimize such deflection, the thermode 10 includes center struts $20_{cl,cr}$, physically separate from the outer struts $20_{ol,or}$. As described below, the lengths and angular orientations of the struts 20 are optimized to minimize deflection of the blade. Preferably, the center struts $20_{cl,cr}$ are 0.9 inches long and oriented at an angle a of 59° with respect to the blade 12. The outer struts $20_{ol,or}$ are longer, e.g. 1.4 inches, and oriented at a 60.5° angle.

Specifically, the dimensions of the thermode components provide a thermode geometry which satisfies a variety of mechanical and thermal load conditions. In other words, the thermode 10 provides significant aggregate bonding performance across different loading conditions, as opposed to optimizing performance for a single loading condition.

Figure 1:
FIG. 1 is a front view of a prior art U-shaped thermode design.
Figure 1A:
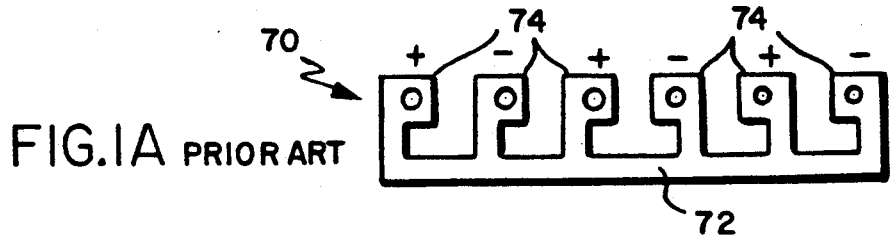
FIG. 1A is a front view of a prior art multiple terminal thermode design.

A series of Finite Element Models (FEM) was constructed to derive the exact dimensions of the blade: The first study was of a prior art U-shaped thermode (FIG. 1) that was "constrained", i.e., held in place at the top of the struts 64 and 66. The base of the blade 62 was modeled as "hanging" in free air, i.e. no contact with a work surface. The length of the blade 62 was maintained at 3 inches, while the lengths and angles of the struts 64 and 66 were varied. A constant voltage was applied across the struts for the exact time required for the transient response of the blade center to come to the approximate set-point bond temperature of 250° c.

At this point in the response, the deflection of the blade 62 was calculated. It was discovered that long struts with sharp angles relative to the blade resulted in negative, i.e. the direction with respect to a work surface, blade deflection, while large angles and short struts (as in the prior art) produced positive deflection. In addition, application of a thermal load at the top of the struts 64, 66 affected the direction of deflection. Specifically, it was discovered that as the thermal load for dissipating heat from the thermode 60 increased, the deflection became more positive. It was also discovered that it was possible to combine various strut lengths, strut angles and heat loads to produce a deflection that approached zero—i.e. the contact surface remained fairly flat. Consequently, to provide flatness and temperature uniformity along the contact surface of the blade, a set of strut lengths and angles were selected such that the deflection was slightly negative if the thermode load, i.e. holder, were a perfect insulator, and slightly positive if the holder were a perfect heat sink.

Next, a perfect heat sink model, i.e. a sink that dissipates all generated heat, was applied to the contact area of the blade, while pressure was also applied to the blade. Application of constant pressure resulted in negative deflection. The addition of center struts, having a direction opposing the outer struts, decreased the magnitude of this deflection.

The model was then alternated between the free and loaded conditions with slight alterations in strut lengths and angles, until the strut dimensions and orientations set forth above were reached.

In accordance with the invention, the thermode blade 12 is substantially thicker than prior art blades. For example, as shown in FIG. 3A, the width of the blade $W_b$ may be 0.100 inch. A wide blade contributes to structural stability, i.e. reduces buckling of the blade; it also provides improved thermal control of the blade, while decreasing thermal uniformity degradation that occurs when a thermal load is applied to the blade. Improved thermal stability of the blade occurs because the heat load of the work surface becomes smaller relative to the thermal mass of the thickened blade. However, typical bonding applications require a bonding strip width of approximately 0.040 inches. Accordingly, the blade 12 includes a step 16 in the contact surface 14. The step 16 preferably has a height $H_s$ of 0.020 inches, and a width $W_s$ of 0.040 inches.

The material of the thermode arrangement also minimizes the deflection of the blade at relatively long lengths. In accordance with the invention, the thermode 10 is preferably composed of molybdenum. Molybdenum has high thermal and electrical conductivities, a low thermal coefficient of expansion, good wear properties, and oxidation resistance at bonding temperatures. Also, unlike copper, molybdenum does not "wet" the solder; i.e. the solder does not stick to the blade.

The high thermal conductivity reduces the thermal gradients and thus increases the temperature uniformity of the blade 12 when it is in contact with the work surface. This results in fewer hot spots and less thermal deflection in the blade. Specifically, pressure is applied to the blade 12 and transferred to the work surface during bonding operations. During the bonding process, the blade typically undergoes a heating and cooling cycle while in contact with the work surface. For prior art thermodes, the heating or cooling of the blade results in deflection because the blade material is constrained from uniform expansion and contraction. In contrast, thermal expansion or contraction of the thermode blade 12 is minimized by the blade shape, high thermal conductivity, large thermal mass and low thermal expansion coefficient of the blade.

Molybdenum also has a high electrical conductivity. This provides for an increase in the acceptable heating rate for a given voltage drop. The voltage drop between two terminals is limited by the maximum allowable voltage drop between two leads of the workpiece contacted by the blade. The approximate instantaneous heating rate is determined by the following formula:

$$dT/dt = 0.5(V_{max}/L)^2 / (p_{cv})$$

where,
p = electrical resistivity of the material;
cv = volumetric heat capacity of the material;
$V_{max}$ = maximum allowable voltage drop across the blade in contact with the work surface footprint;
L = length of the blade +/− the voltage terminals;
dT/dt = rate of temperature rise.

Thus, with a low resistivity, i.e. high conductivity, a higher heating rate is achievable.

FIG. 4 illustrates the use of the thermode arrangement 10 when soldering the leads 82 of an electronic component 80 to the pads 86 of a circuit board 84. The structure of the thermode 10 enables the blade 12 to provide uniform pressure to the leads 82 and pads 86. This is important because the component leads 82 typically rest on the pads 86. The application of uniform pressure by the blade prevents the leads from moving away from the pads, while providing good thermal contact with them. The uniform heat distribution along the blade allows the leads 82 to be soldered to the pads 86 simultaneously and reliably.

Referring to FIGS. 2 and 4, the thermode 10 is used in connection with a power supply unit 50 and transformer 40 capable of supplying high current, e.g. 600 amp, and low voltage, e.g. ½-2 volts. The thermode holder 30 includes a metallic-connected center shaft 32 to lower metal block 31 of base 34 and a metal sleeve 33a connected to upper metal block 33 of base 34. The shaft 32 is electrically insulated from the sleeve 33a and block 33 by an insulative bushing 42. The blade 12 is coupled to the block 31 and 33 by means of bolts, generally designated 24, inserted through the terminals 22. Specifically, terminals $22_{cl,cr}$ are coupled to the recessed portion 31a of block 31 and terminals $_{ol,or}$ are coupled to the recessed portion 33b of block 33. During heating and cooling periods of a soldering cycle, the pairs of terminals, i.e. $22_{ol,or}$ and $22_{cl,cr}$, should not move relative to each other because of expansion of the holder 30. To prevent such movement, a pair of screws 37 (insulated by polyimide, e.g., VESPEL bushings) 37a are inserted through block 31 and into block 33 of the base 34. A spacer 44, functioning as an electrical insulator, is then positioned between the blocks. Specifically, the spacer 44 is positioned around the shaft 32 so as to insulate the block 31 from block 33. The spacer 44 extends along a side of the block 33 facing the heat sink 35 so as to electrically insulate the block 33 from the heat sink 35. Clamps 36a,b coupled to the ends of a pair of arms 38a extending from the transformer 40, attach to the shaft 32 and sleeve 33a of base 34. The spacer 44 and bushing 42 are made of electrically insulative, rigid polyimide material, such as TORLON, which is chosen for its desirable thermal expansion property. A heat sink 35 is attached to block 31 to (i) equalize the temperatures between terminals $22_{ol,or}$ and terminals 22cl,cr and (ii) decrease the cooling period required for soldering.

The temperature of the blade 12 is raised and lowered by controlling the current passing through it. A thermocouple 45 attached to the contact surface 14 of the blade serves as a "feedback" mechanism to a controller (not shown) located in the power supply unit 50.

In operation, power is applied to the thermode 10 to heat the blade 12. Specifically, power is provided from the transformer 40 through upper and lower arms 33a,b and to upper and lower clamps 36a,b, which connect to the shaft 32 and sleeve 33a of base 34, respectively. This provides current for a circuit that comprises the following connected elements: transformer 40 to upper arm 38a to upper clamp 36a to shaft 32 to block 31 to terminals $22_{ol,or}$ to thermode blade 12 to terminals $22_{ol,or}$ to block 33 to sleeve 33a to lower clamp 36b to lower arm 38b and back to transformer 40. The arms 38 are lowered to bring the thermode blade 12 into contact with the leads 82 and pads 86 as the temperature of the blade is increased to the bonding, i.e. soldering, set point. Soldering then ensues while the temperature of the blade is held steady for a brief period of time; thereafter, the temperature is decreased to below the reflow temperature, thus allowing the solder to cool. After the blade 12 is cool enough to ensure that the leads are soldered firmly in place, the blade is lifted.

During all heat phases of the soldering cycle, the blade 12 should provide pressure and heat to each lead 82. If a lead is not held firmly during heating, the heat will not reach the solder on the pads 86. Similarly, if a lead is not held during cooling, it will break free of the molten solder. The invention described herein provides a flat blade contact surface 14 to the leads at all phases of the solder cycle.

As noted, the array of leads 82 typically has a footprint with a length of about 3.0 inches and a width of approximately 0.040 inches. The step 16 enables soldering in accordance with this footprint requirement. The step 16 (FIG. 3A) allows use of a desirably thermally massive blade 12, i.e. 0.100 inches thick.

In accordance with the invention, the thermode arrangement provides uniform heat and pressure to a strip-like area in order to facilitate uniform soldering, specifically soldering of a plurality of component leads to printed circuit boards. The arrangement also facilitates de-soldering component leads and "treating" conductive solder pads, i.e. applying heat and force to a solder pad to "planarize" it to a more uniform profile.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. A thermode arrangement for bonding the leads of an electronic component to a circuit board, said arrangement comprising:
   a generally elongate blade composed of a high thermal and electrical conductivity, low thermal expansion material and including a contact surface for heating the leads of the component;
   a plurality of angular support struts, each integrally coupled at a first end thereof to a back surface of said blade opposite said contact surface, said struts comprising a pair of outer struts and a pair of inner struts shorter in length than said outer struts, each of the outer struts connecting with said blade at an acute angle facing the other outer strut, each of the inner struts connecting with said blade at an acute angle facing the outer strut adjacent thereto, whereby, in response to a force urging said blade against the circuit board, said outer struts cause a negative deflection of said blade with respect to said circuit board and said inner struts decrease the magnitude of the deflection;
   a holder coupled to each of said support struts at a second end thereof for supporting said blade and said struts; and
   means, coupled to said holder, for heating said blade.

2. The thermode arrangement of claim 1 wherein said material is molybdenum.

3. The thermode arrangement of claim 2 wherein said heating means comprises a power supply coupled to a transformer for providing electric current through said blade to heat said blade.

4. The thermode arrangement of claim 3 wherein said holder includes a base having an upper block and a lower block.

5. The thermode arrangement of claim 4 further comprising a heat sink attached to said lower block of said base.

6. The thermode arrangement of claim 5 wherein said holder further comprises a shaft connected to said lower block and a sleeve of said base connected to said upper block, and wherein said upper block is coupled to said second ends of said pair of outer struts and said lower block is coupled to said second ends of said pair of inner struts; and
   said transformer comprises means or attaching to said sleeve of said base and said shaft.

7. The thermode arrangement of claim 6 further comprising a thermocouple attached to said blade and coupled to said power supply for controlling the temperature of said blade during bonding.

8. A thermode arrangement for bonding the leads of an electronic component to a circuit board, said arrangement comprising:
   a generally elongate blade composed of a high thermal and electrical conductivity, low thermal expansion material and including a contact surface for heating the leads of the component;
   a plurality of angular support struts, each integrally coupled at a first end thereof to a back surface of said blade opposite said contact surface, said struts configured as a set of outer struts and a set of center struts configured as a set of outer struts and a set of center struts shorter in length than said outer struts, each of the outer struts connecting with said blade at an acute angle facing the other outer strut, each of the center struts connecting with said blade at an acute angle facing the outer strut adjacent thereto, whereby, in response to a force urging said blade against the circuit board, said outer struts cause a negative deflection of said blade with respect to said circuit board and said center struts decrease the magnitude of the deflection;
   a holder for supporting said blade and said angular struts, said holder including a base connected to a shaft, said base including a sleeve connected to an upper block and also including a lower block, such that said upper block is coupled to a second end of each of said outer struts and said lower block is coupled to a second end of each of said center struts;
   a power supply coupled to a transformer for providing an electric current to uniformly heat said blade, said transformer including means for attaching to said sleeve of said base and to said shaft; and
   a thermocouple attached to said blade and coupled to said power supply for controlling the temperature of said blade during bonding.

9. The thermode arrangement of claim 8 wherein said material is molybdenum.

10. A thermocoupled comprising:
    a generally long blade composed of a high thermal conductivity, low thermal expansion material ;and
    a plurality of struts, each having a first and second end, said struts configured and arranged to support the application of uniform pressure against a surface carrying conductors to be bonded, said struts comprising:
       a pair of outer struts, each connecting with said blade at its first end and at an acute angle facing the other outer strut; and
       a pair of inner struts shorter in length said outer struts, each connecting with said blade at its first end and at an acute angle facing the outer strut adjacent thereto,
    whereby, in response to a force urging said blade against the surface carrying conductors to be bonded, said outer struts cause a negative deflection of said blade with respect to the surface and said center struts decrease the magnitude of the deflection.

11. The thermode of claim 10 wherein said blade includes an upper portion and a lower portion, said lower portion for contacting elements to be bonded by the application of heat from said thermode, said lower portion having a width substantially less than that of said upper portion, whereby said upper portion provides substantial thermal means to prevent undue decrease in the temperature of said blade during bonding operations.

12. The thermode of claim 11 wherein said material is molybdenum.

13. The thermode of claim 12 wherein the acute angle provided by said outer struts is 60.5° and wherein the acute angle provided by said inner struts is 59°.

14. The thermode of claim 13 wherein the length of said inner struts is 0.9 includes and the length of said outer struts is 1.4 inches.

15. The thermode of claim 14 wherein:
the length of said blade is approximately 3.2 includes;
the width of said upper portion of said blade is approximately 0.100 inches; and
the width of said lower portion of said blade is approximately 0.040 inches.

* * * * *